United States Patent [19]

Rodden et al.

[11] 4,366,190

[45] Dec. 28, 1982

[54] LOCKING PATCH MACHINE

[76] Inventors: Philip J. Rodden, 42 Baker Ave., Beverly, Mass. 01915; Richard J. Duffy, 23 Lee St., Salem, Mass. 01970

[21] Appl. No.: 262,194

[22] Filed: May 18, 1981

Related U.S. Application Data

[63] Continuation-in-part of Ser. No. 163,217, Jun. 26, 1980, abandoned.

[51] Int. Cl.³ ............................................. B05D 7/22
[52] U.S. Cl. .................................... 427/183; 118/308; 118/313; 118/318; 118/319; 427/195; 427/234
[58] Field of Search ............... 118/319, 318, 308, 315, 118/313; 427/195, 181, 183, 182, 234

[56] References Cited

U.S. PATENT DOCUMENTS

| | | | |
|---|---|---|---|
| 3,592,676 | 7/1971 | From et al. | 427/181 |
| 4,054,688 | 10/1977 | Duffy et al. | 427/183 |
| 4,060,868 | 12/1977 | Axvig et al. | 118/317 |
| 4,100,882 | 7/1978 | Duffy et al. | 427/181 |

*Primary Examiner*—Shrive P. Beck

[57] ABSTRACT

An improved machine is provided for the continuous manufacture of self-locking internally threaded articles. A movable support member for receiving the fasteners is provided with a plurality of rotatable platforms, one for each fastener, each platform having a pinion disposed at the underside thereof. A stationary rack is aligned to mesh with the pinions at a predetermined location along the path of movement of the support member whereby the platforms and fasteners located thereon are continuously rotated during application of the locking patch to the internal threads over a desired circumferential portion of the threads, during movement of the support member.

34 Claims, 7 Drawing Figures

LOCKING PATCH MACHINE

This application is a continuation-in-part of Ser. No. 163,217, filed June 26, 1980 and now abandoned.

BACKGROUND OF THE INVENTION

The present invention relates to an improved apparatus for the manufacture of self-locking internally threaded elements and more particularly to a device for the continuous manufacture of self-locking fasteners wherein the self-locking feature is obtained through a deformable plastic patch which is applied over a desired circumferential segment of the internal threads of the element.

In prior art patents issued to the assignee of the present invention, including U.S. Pat. No. 3,995,074 issued Nov. 30, 1976, U.S. Pat. No. 4,054,688 issued Oct. 18, 1977 and U.S. Pat. No. 4,100,882 issued July 18, 1978, there is disclosed apparatus and methods for applying locking patches of resilient resin to internally threaded articles such as nuts, having openings at both ends of the threaded portions. In the devices disclosed in these patents, generally a rotatable table is disposed for receiving fasteners about the periphery of the table and transporting them through a plurality of stations to effect application of the patch to the internal threads of the fastener elements.

In U.S. Pat. Nos. 4,054,688 and 4,100,882 there is provided a means whereby a portion of the heat fusible resin particles is deposited on one area of the hot threaded surface of an element, and thereafter, resin particles are deposited on a further area of the threaded surface to produce two distinct patches at a desired location. In each of the aforementioned patents, the internally threaded element is retained on the rotatable support member in a selected position by means of a slot which receives a portion of the external hex of a hex headed nut, by way of example. After a discrete patch is applied to the internal threads of the fastener, a turning moment is applied to the fastener element to move it such that a different external surface of the hexagonal element is received the slot, after which a second discrete patch is applied to the fastener U.S. Pat. No. 3,416,492, issued Dec. 17, 1968, shows a device for holding a threaded fastener and applying a coating through 360° of threads thereon.

While the above referred to apparatus and methods have proved to be successful in achieving the objects for which they were intended, the particular devices and methods disclosed are directed to the application of one or more discrete patches to the internal threads of an element.

It has been found that there are applications in which it becomes desirable to apply a continuous circumferential locking patch to the internal threads of the fastener element. In many instances, it has been regarded that the locking patch be applied through the entire 360 degree arc of the internal threads in uniform manner, while other applications may require a lesser angle of patch to be applied to the threads. To accomplish this, it is necessary to uniformly rotate the fastener element through at least the desired angle of application, while resin particles are being directed against the threaded surface only during the desired angle of application, to build up deposits on the required areas.

It is therefore an object of the present invention to provide a method and apparatus for the manufacture of self-locking internally threaded elements wherein the locking body of resilient resin is applied over a desired arcuate portion of the internal threads.

It is a further object of the invention to provide a method and apparatus wherein a self-locking internally threaded element is manufactured having a locking body of resilient resin provided over 360 degrees of arc of the internal threaded surface.

SUMMARY OF THE INVENTION

The above objects, and other objects which will become apparent as the description proceeds, are achieved by providing apparatus for applying locking patches of resilient resin to a succession of internally threaded articles having openings at both ends of the threaded articles comprising a feeder to supply the threaded articles in substantially continuous succession, a support for receiving the threaded articles from the feeder and for conveying them in a substantially fixed relation with respect to the support for a portion of a path for treatment of successive articles with the axes of the threaded portions in an up and down position and with the openings at the upper and lower ends of the threaded portions substantially uncovered. Means is provided for heating threaded portions of the articles to a temperature above the softening point of the resin to be applied, and means are associated with each of said articles for directing particles of heat fusible resin upwardly through the openings at the lower ends of each of the articles against an area of each of the threaded portions of the articles in said portion of the path to cause the resin particles to be softened by heat from the threaded portions and to build up a deposit on each of the areas. The support has a plurality of rotatable platforms disposed thereon, one for receiving each of the threaded articles, and stationary meeans is located adjacent the path of the support contacting a portion of each of the platforms thereby causing rotation of the platforms and a fastener disposed thereon whereby said heat fusible material is deposited onto a desired circumferential segment of said threaded portion during movement of the support along the path.

In a method aspect, the invention provides a process for applying locking patches of resilient resin to internally threaded articles having openings at both ends of the threaded portions which comprises conveying the articles in a path for treatment with the axes of their threaded portions in an up and down position and with the openings at the upper and lower ends of the threaded portions substantially uncovered, heating the threaded portions of the articles to a temperature above the softening point of the resin to be applied, directing particles of heat fusible resin upwardly through the openings at the lower ends of the articles against an area of each of the threaded portions during movement along the path to cause the resin particles to be softened by heat from the threaded portions and to build up a deposit on the area, turning each of the articles about the axis of its threaded points while directing said resin particles through said openings during a predetermined arcuate angle at a substantially uniform rate of rotation.

Alternatively, the support has a plurality of circumferential notches which each receive a threaded article, and rotary means direct a resin nozzle within an arcuate path in the threaded article. The rotary means is engageable with stationary means located adjacent the path of support to effect rotation of the nozzles whereby heat fusible material is depostited onto a desired circumferential segment of said threaded portion during movement along the path.

BRIEF DESCRIPTION OF THE DRAWINGS

For a more complete understanding of the invention, reference should be made to the following description of a preferred embodiment, taken in conjunction with the drawing thereof, wherein.

DESCRIPTION OF THE PREFERRED EMBODIMENT

Figure 1:
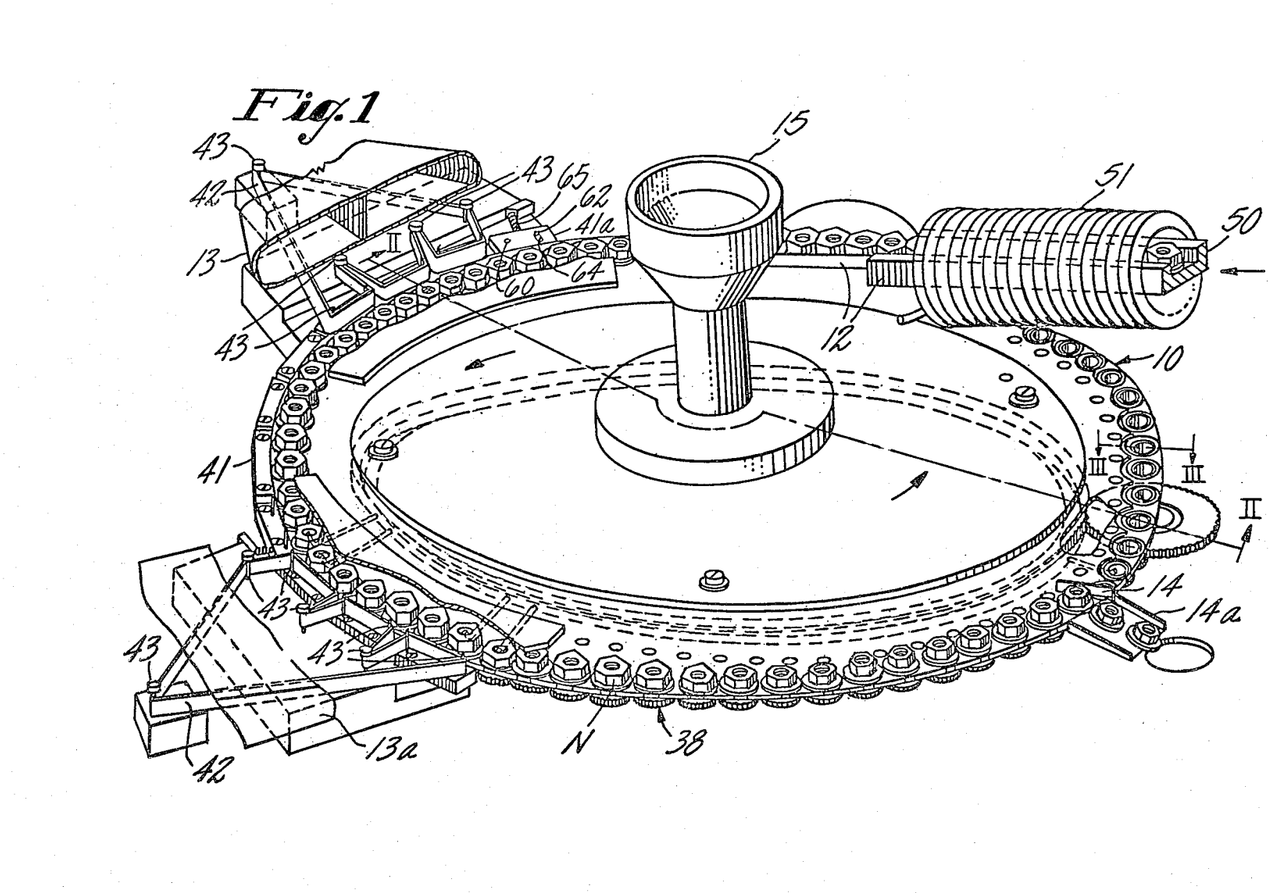
FIG. 1 is a perspective view showing a device for the manufacture of self-locking internally threaded fasteners constructed in accordance with the teachings of the present invention.
Figure 2:
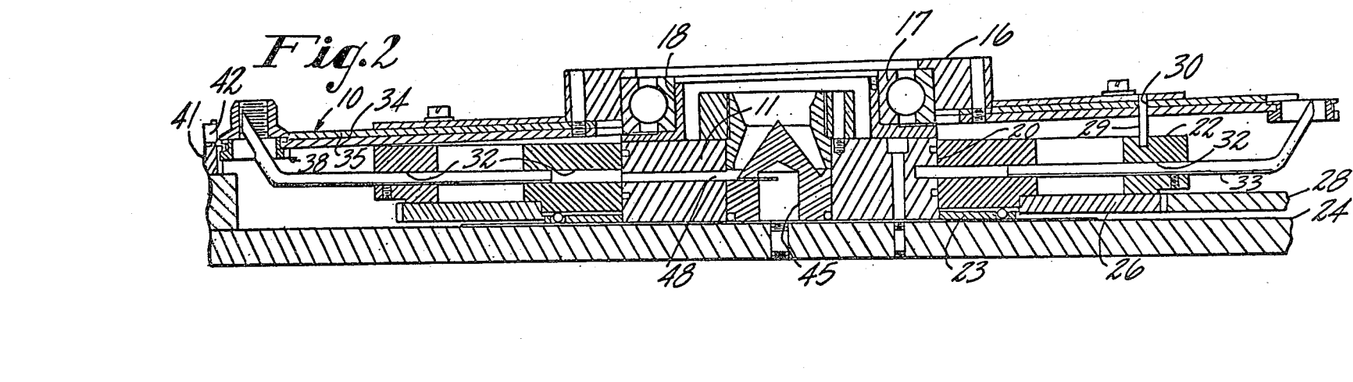
FIG. 2 is a sectional elevational view taken along the line II—II of FIG. 1, showing details of the structure of FIG. 1.

Referring to the drawings, and in particular to FIGS. 1 and 2, there is shown apparatus for the manufacture of a self-locking internally threaded article in the form of a flange nut N, which generally comprises a rotatably mounted transport member in the form of a table 10 movable along a predetermined rotary path about its central axis, in the direction shown by the arrows of FIG. 1.

As the table 10 is continuously rotated about a fixed housing 11 a point on the table 10 will be seen to pass through a plurality of stationary work areas referred to as stages of the operation for the purposes of the present description.

In the first stage of operation, loading chute 12 which is inclined downwardly toward the surface of the table 10 is effective to deposit a flange nut N onto the table, and during the next stage a resilient thermoplastic material in powdered form is applied to the internal threaded surface of the nut. This stage is substantially enclosed by a vacuum hood 13 the operation of which is explained in detail below.

The next stage in the operation is identical to the first stage, in that the flange nut N is subjected to a second deposit of resilient thermoplastic material in powdered form which is applied to the internal threaded surface of the nut in the enclosed vacuum hood 13a.

During the next stage, an arm 14, connected to an inclined ramp 14a, and having a cam surface disposed adjacent the upper surface of the table 10 is effective to unload the nut N from the support structure 24 and convey it into an opening in the support structure. During a subsequent stage of operation, which substantially covers that portion of the table 10 located between the unloading station and the loading station, the means for applying thermoplastic material to the nut N are purged of residual material, and are readied for the next sequence of operation.

Referring to FIG. 1, the stationary housing 11 is provided with a funnel shaped hopper 15 which serves to receive the powdered resilient thermoplastic resin for application to the internal threads of the nut N.

Referring to FIG. 2, it will be noted that the table 10 is provided with a hub 16 which receives a ball-bearing member 17. The central housing 11 is provided at its upper portion with a bearing surface 18 on which the table hub 16 and bearing 17 are received.

The external surface of the housing 11 further provides a second bearing surface 20 on which is mounted a rotatable block 22. The rotatable block 22 rests on a ball-bearing unit 23 disposed on the upper surface of support structure 24, which also supports the housing 11.

As will be noted from FIG. 2, that cylindrical portion of housing 11 on which the bearing surface 20 is formed, is substantially perpendicular to the support structure 24 and therefore the rotatable block 22 moves in a plane substantially parallel to the surface of the support structure 24. However, that cylindrical portion of the housing 11 on which the bearing surface 18 is formed is slightly canted with respect to the surface of the support structure 24, providing for rotation of the table 10 in a plane forming a slight angle with the surface of the support structure 24, and the plane of rotation of the block 22. The importance of this feature will become apparent as the description proceeds.

The rotatable block 22 is provided with a ring gear 26 in meshing engagement with a gear 28 connected to a drive motor. Extending upwardly from the block 22 is a pin 29 which is slidably received in a cylindrical bore 30 formed in the table 10. It will therefore be evident from FIG. 2, that operation of the motor to drive the gear 28 causes rotation of the blcok 22 which in turn drives the table 10 by virtue of the interconnecting relationship between the pin 29, the table, and the block. It should further be evident that rotation of the block 22 and the table 10 causes the block and table to move to a position where the two members are in close relation to one another, to a relation where they are separated a maximum distance apart as shown.

Referring still to FIGS. 1 and 2, the block 22 is shown to have formed therein a plurality of circular cross-section apertures 32 each having an opening inwardly toward the housing 11 and receiving at the opposite end a tube 33, the tube and aperture forming in combination a conduit means.

As best shown in FIG. 2, the table 10 comprises an upper plate 35 and lower plate 34, the lower plate having a plurality of circular openings 36 formed about its periphery and the upper plate having a plurality of semi-circular walls 37 forming the outer periphery thereof, adjacent the openings 36. As a tube 33 is provided at each of the openings 36, rotation of the table 10 and block 22, as described above, causes the tubes 33 to be moved upwardly through the openings 36 to a position shown at the left of FIG. 2 and downwardly to a position shown at the right of FIG. 2, due to the angular orientation of the plate and block.

Figure 3:
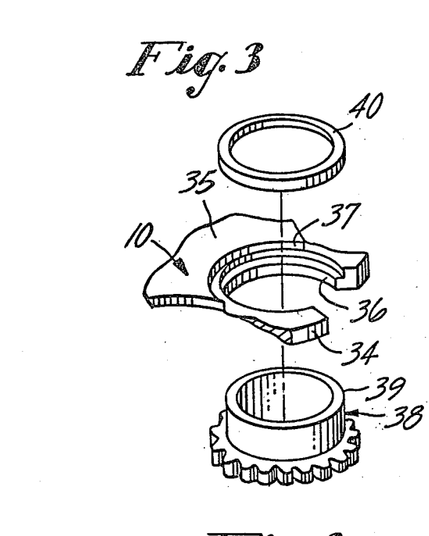
FIG. 3 is an exploded perspective elevational view, taken on an enlarged scale, showing elements forming a typical nut supporting platform in the structure of FIGS. 1 and 2.
Figure 4:
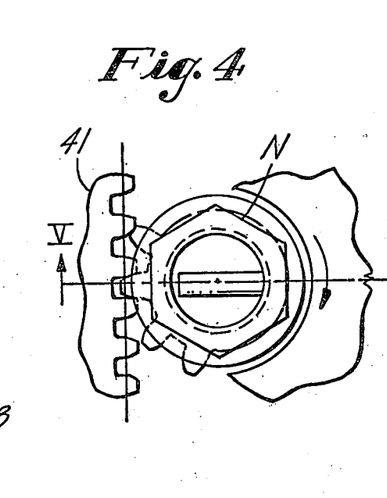
FIG. 4 is a top plan view showing a typical nut supporting platform of the structure of FIGS. 1 and 2, taken on an enlarged scale to show further details of the elements.
Figure 5:
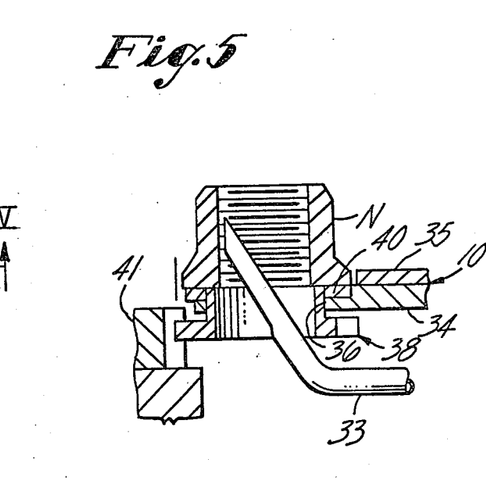
FIG. 5 is an elevational sectional view taken along the lines V—V of FIG. 4.

As best shown in FIGS. 3 to 5, at each of the openings 36 in the plate 34, a pinion gear 38 is assembled by inserting a tubular flange 39 of the gear through the opening 36 from the underside of the plate 34, after which a locking ring 40 is press-fit onto the flange 39. The locking ring 40 is of a thickness to be received in a counter bore formed in the plate 34 such that the upper surface of the ring is flush with the top surface of the plate 34. Clearance between the opening 36 and the flange 39 is such that the pinion gear 38 is free to rotate when so assembled.

Referring now to FIG. 1, taken together with FIGS. 4 and 5, at selected arcuate segments of the path of circular rotation of the table 10 and block 22, one or more racks 41 are disposed such that the teeth of the rack 41 will be brought into meshing engagement with the teeth of a pinion gear 38 during rotation of the table and block combination. The blocks 41 are mounted to the upper surface of the stationary support structure 24 as best shown in FIG. 2.

A first rack 41a is pivotably mounted at one end by a pin 60, and at the opposite end thereof is guided by a stationary pin 62 slidably received in a slotted opening 64 in the rack. As each pinion gear 38 enters the series of racks 41 and 41a, the possibility of jamming the device due to the angle of tooth-to-tooth engagement of a pinion gear with the initial rack is prevented, in that should such engagement occur, the rack 41a is pivoted away from the pinion gear 38 against the force of a spring 65, allowing the gear to rotate and properly align itself with the teeth of the rack 41a.

While the means for contacting the pinion gear 38 is shown herein as one or more stationary racks, it should be evident that such means could be a circular ring gear having internal teeth aligned to mesh with the pinion gear 38 at desired locations, or portions of such a gear employed in a similar fashion as the described racks.

As is further shown in FIG. 1, at each of the stages wherein the hood 13 and 13a are located, means are provided to contact the outer flange face of the periphery of the nut N, while the nut N is being processed at that stage. In the preferred embodiment, a silicone belt 42 is threaded over a plurality of pins 43 to form a substantially arcuate belt surface, conforming substantially to the circumference of the outermost periphery of the flange on the nuts N, as they are rotated.

In operation, the present device employs the principles taught in U.S. Pat. No. 3,995,074, 4,054,688 and 4,100,882 in dispensing material from the funnel 15 to the exit point from the outer end of each tube 33. Briefly stated, a preferred material as provided for in U.S. Pat. No. 3,858,262 assigned to the assignee of the present invention, is provided at the hopper 15, and is forced through the tubes 33 by fluid pressure caused by an air pump, the air pressure being introduced into the circular bore 45 in the housing 11. In the present invention, however, as it is desired to provide continuous depositing of material on the fastener throughout an arcuate segment of rotation of the table 10, an arcuate bore 48 is provided in the housing 11 extending over that arcuate segment through which continuous depositing of material is desired, and extending through the housing from the bore 45 to the circular aperture 32, when aligned with the arcuate bore 48.

Referring now to FIG. 1, a sequence of operation will be described in which it is desired to provide a locking patch over 360 degrees of a portion of the internal threads of the fastener element N and where it has been determined that two applications of the resilient thermoplastic material are necessary to ensure the desired thickness of the locking patch. In practicing the teachings of the present invention, the fasteners N are fed from a vibrator device or other known means (not shown) into a chute 50 which is surrounded by a heating coil 51 where the fastener N is raised to a temperature sufficient to cause a thermoplastic powder to adhere to the threaded surface of the fastener when contacted thereby, and to be fused by heat from the surface to form a continuous plastic body. As each fastener N approaches the table 10, the fastener will be deposited in registry with a semi-circular wall 37 of the plate 35.

In the described typical cycle of operation, a plurality of the fasteners N are contained on a vibratory feeder or other device (not shown) which is effective to feed the fasteners into the chute 50 where they are passed through the heating coil 51 and raised to a temperature sufficient to cause a thermoplastic powder to adhere to the threaded surface of the fastener.

Each fastener N is in turn therefore, located in a position as shown in FIGS. 4 and 5 wherein the flange of the fastener is disposed on the surface of the table 10 adjacent the semi-circular wall 37, supported partially by the tubular flange 39 of the pinion gear 38 forming a rotatable platform for the fastener. The fastener N is then passed into an area along the circular path of the table 10 wherein the circular cross-section aperture of the tube 33 is open to the arcuate bore 48 providing the flow of resin material through the bore and tube 33 and into the flanged nut N in the manner described in the prior art, heretofore referenced. As each fastener approaches the point at which the aperture 32 of the tube 33 is subjected to the flow of material, the pinion gear 38 on which the fastener N is resting is brought into meshing engagement with a rack 41, and the gear is caused to turn, thereby rotating the fastener during the deposit of material onto the threads. In the area of the table rotation where the material is being deposited in the fastener threads, the flange of the fastener also contacts the silicone belt 42 to thereby retain the fastener in proper position relative to the tube 33 during the depositing of material onto the fastener.

As previously described, the arcuate bore 48 is designed and fabricated to cover that arcuate portion of the table rotation adequate to cover the desired portion of the internal threads on which the patch is to be deposited, taking into account the rotation of each fastener N relative to the rotation of the table 10. As an example, if it is desired to deposit a patch covering the full 360 degrees internal surface of the fastener threads, the arcuate bore 48 will be disposed over an arc through which the table 10 travels during at least one rotation of the fastener N through 360 degrees.

In the present embodiment, a second stage of depositing material is provided in that a greater build-up of material was deemed necessary than that which could be provided in a single stage of application. It should be evident that during this second stage, or any subsequent stages, the objective is achieved by the disclosed device in arrangement of the elements as described above, during a subsequent arc or rotation of the table 10.

As the dial 10 is moved towards the arm 14, the dial is moved away from the block 22 and the fastener is lifted above the related tube 33 such that it is easily removed by sliding motion onto the ramp 14a.

It should here be noted that each of the hoods 13 and 13a are provided with a negative pressure by vacuum producing means (not shown) and function in a similar manner to those systems disclosed in the aforementioned U.S. patents assigned to the assignee of the present invention, serving to remove excess material during the application of locking patch.

From the foregoing, it should be evident that Applicant's novel structure and method is effective to provide a flange nut, or other type fastener, with a locking patch of resilient thermoplastic material which may be disposed over 360 degrees of the internal threads, or such portions of the threads as is desired.

Further, the present invention provides an easy discharge of the fasteners from the table by rotating the table at an angle to the tube supporting means, which is disposed to maintain the tubes in a desired location for depositing material at the depositing station, but below the surface of the support table at the location where fasteners are removed from the table 10.

Figures 6, 7:
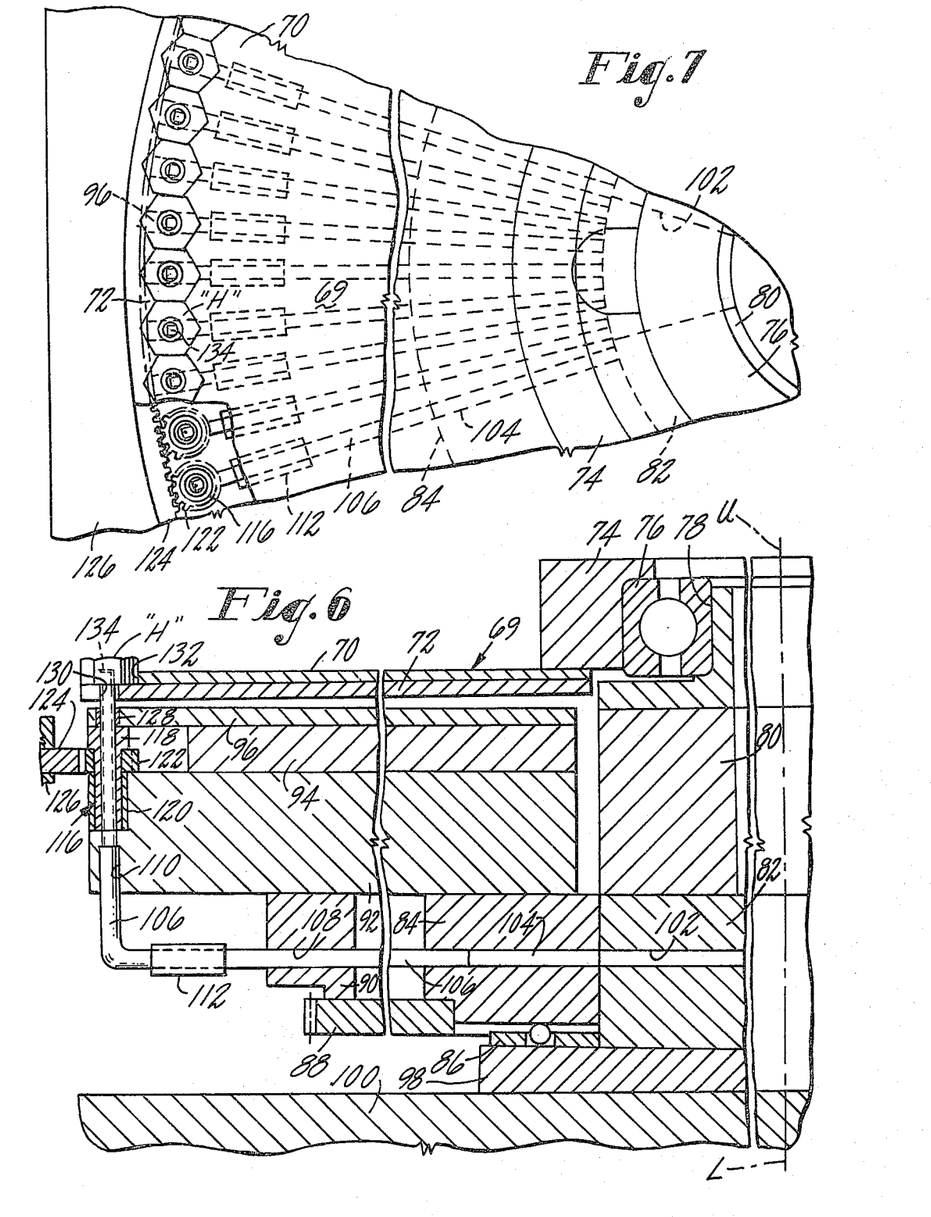
FIG. 6 is a partial sectional elevational view of an alternative embodiment of the manufacture of self-locking internally threaded fasteners.
FIG. 7 is a view taken along the lines VII—VII of FIG. 6.

A further preferred embodiment for applying locking resin to a threaded article "H", is shown in FIGS. 6 and 7, wherein a table 69 comprises a generally horizontally disposed upper locating plate 70 and a lower support plate 72. Both plates 70 and 72 rotate about a horizontal plane on a hub 74 which hub 74 receives a bearing member 76 mounted on a bearing surface 78 of an upper housing 80. The upper housing 80 is supported on a lower housing 82, which lower housing 82 is skewed slightly with respect to the horizontal and has an axis "L" which is skewed correspondingly with respect to a generally vertical axis of rotation "U" of the upper housing 88. A rotary block 84 is supported on a lower bearing unit 86 and is journalled about the skewed lower housing 82. A ring gear 88 is attached at its inner periphery, to the rotary block 84, and at an upper edge thereof, to an annular support member 90. The rotary block 84 and the annular support member 90 are each secured to and support a lower disc 92, an intermediate disc 94 of slightly smaller diameter and an upper disc 96. The lower housing 82 and the lower bearing unit 86 are supported on a tapered base 98 which may be disposed on a horizontally arranged support surface 100. An empowered gear, not shown, is engageable with the ring gear 88 to rotate the totality of rotatable units in this embodiment in a manner similar to what was described in the aforementioned embodiment.

At least one wide conduit 102, of a wedge or triangular cross-section in the horizontal plane, as shown in FIG. 7, is arranged in the lower housing 82 and is serially communicable with a plurality of radially directed cylindrically shaped channels 104, only one being shown in the rotary block 84. A tube 106 extends radially outwardly from each channel 104, through a radially directed orifice 108 in the annular support member 90, and extends into a generally upwardly arranged orifice 110 in the lower disc 92. The tube 106 includes a flexible portion 112 therealong facilitating assembly of the device. Each orifice 110 is in communication with an opening 114 in the lower end of an applicator mechanism 116. Each applicator mechanism 116 includes an elongated conduit 118 rotatively supported in a bushing 120 spaced adjacent the periphery of the lower disc 92. A pinion gear 122 is securedly arranged about the conduit 118 and is in continuous engagement with an annular rack 124 having teeth directed inwardly, completely encircling the periphery of the intermediate disc 94. The annular rack 124 is rigidly supported on an outer support 126 and is arranged on the same rotational plane as the intermediate disc 94. Each conduit 118 is journalled in an upper bushing 128 arranged in openings adjacent the periphery of the upper disc 96, and is extendable through a generally rectangularly shaped array of orifii 130 arranged near the periphery of the lower support plate 72.

The upper locating plate 70 has a peripherally spaced array of notches 132 arranged to mate with the particular side configuration of any threaded article "H" disposed therein, which disposition therein is facilitated as in the aforementioned embodiment, and which notches 132 are arranged so as to be spaced above the orifii 130 in the lower support plate 72.

Operation of the locking resin disposition mechanism is begun, as mentioned, by disposing a plurality of heated threaded articles "H" seriatum in each notch 132 as the table 69 rotates. The resin, not shown, is injected as in the aforementioned embodiment, into the lower housing 82, through each of the wide "wedge shaped" conduits 102 into the respective channels 104 as they each rotate into communication with each wide conduit 102, through the tube 106 and into the applicator mechanism 116, which has as its uppermost portion, a flange 134, to deflect the moving resin, towards the mid-portion of the threaded article "H". Both the upper locating plate 70 and the lower support plate 72 rotate at the same speed as the lower, intermediate and upper discs 92, 94 and 96, because of the interaction of the aforedescribed pin 29 from the upper disc 96 in sliding registration with the cylindrical bore 30 in the upper and lower plates 70 and 72. As they rotate, the teeth of the pinion gear 122 engage the teeth of the annular rack 124 to effectuate rotational motion within each respective applicator mechanism 116 itself about its longitudinal axis, thereby causing the deposition of the locking resin through the entire internal circumference of each threaded article "H", or through whatever angular portion is desired, depending upon the width of the exit end of the wedge conduit 102.

Continued rotation of the upper locating plate 70 and the lower support plate 72 in a horizontal plane and rotation of the applicator mechanism 116 in a plane slightly askew therewith, effectuates withdrawal of the applicator mechanism 116 from traveling along in a portion of the circumferential path of each orifice 130, to traveling along a circumferential path beneath the orifii where the planes of motion are spread apart, thereby permitting subsequent off-loading of locking resin coated threaded articles "H" therefrom, and subsequent on-loading of uncoated threaded articles "H" into the circumferential notches 132, which then will subsequently be "entered" by the respective applicator mechanisms 116 in the appropriate portion of the circumferential path.

The embodiments of the invention in which an exclusive property or privilege is claimed are defined as follows:

1. An apparatus for applying locking resin to a succession of internally threaded articles, comprising:
   a feeder to supply said threaded articles in substantially continuous succession;
   a support for receiving said threaded articles from said feeder for conveying them along a path for treatment, the successive threaded articles having their axes of their threaded portions in an up and down position and having an opening at the lower end of the threaded portion substantially uncovered;
   means for heating said threaded portion of said threaded articles to a temperature above the softening point of a resin to be applied;
   applicator means associated with each of said threaded articles for directing particles of heat fusible resin upwardly through said openings at the lower ends of each of said threaded articles against an area of each of said threaded portions of said threaded articles in said portion of said path to cause said resin particles to be softened by heat from said threaded portions and to build up a deposit on each said area;

said threaded articles and said applicator means being rotatable one with respect to the other during application of the heat fusible resin to said article; and stationary means located adjacent the path of said support to thereby cause said rotation between said threaded article and said applicator means, whereby said heat fusible material is deposited onto a desired circumferential segment or said threaded portions during movement of said support along said path.

2. An apparatus for applying locking resin to a succession of threaded articles as recited in claim 1, wherein said threaded articles remain stationary with respect to said support, and said applicator means rotates within said threaded articles to effectuate discharge and deposition of the locking resin through an arcuate path on the threaded portion of the non-rotatively disposed threaded article.

3. An apparatus for applying locking resin to a succession of threaded articles as recited in claim 1, wherein each of said threaded articles are rotatively arranged with respect to said support, and said applicator means is stationary therewith, to effectuate discharge and deposition of the locking resin through an arcuate path on the threaded portion of the rotatively disposed threaded article.

4. An apparatus for applying locking resin to a succession of threaded articles as recited in claim 2, wherein said support comprises a circular plate mounted for rotation about an upper hub, said circular plate having a plurality of notches circumferentially arranged therearound each notch matable with a threaded article during movement of said support along said path.

5. An apparatus for applying locking resin to a succession of threaded articles as recited in claim 2, wherein a disc is rotatively arranged on a lower hub beneath said support, said disc rotatively securing said applicator means beneath said threaded articles on said support, said applicator means having a pinion gear arranged therearound.

6. An apparatus for applying locking resin to a succession of threaded articles as recited in claim 5, wherein said stationary means for causing said rotation comprises a rack gear disposed about the periphery of said disc, said rack gear having a plurality of teeth aligned for mating engagement with said pinion gear.

7. An apparatus for applying locking resin to a succession of threaded articles as recited in claim 5, wherein said supports is rotatively disposed in a horizontal plane and said disc is rotatively disposed in a plane which is slightly askew with respect to the plane of said support.

8. An apparatus for applying locking resin to a succession of threaded articles as recited in claim 5, wherein said lower hub has at least one wedge shaped conduit for channeling locking resin to said applicator means over a predetermined arcuate path as said applicator means travels along said treatment path.

9. An apparatus for applying locking resin to a succession of threaded articles as recited in claim 7, wherein said skewness between said planes of rotation of said support and said disc effectuates an alternating entry and withdrawal sequence of said applicator means in said opening of said threaded article.

10. An apparatus for applying locking resin to a succession of threaded articles as recited in claim 3, wherein said support has a plurality of rotatable platforms disposed peripherally therearound, for receiving each of said threaded articles; and stationary means located adjacent the path of said support for contacting a portion of each platform and any threaded article disposed thereon whereby said heat fusible material is deposited onto a desired circumferential segment of said threaded portions during movement of said support along said path.

11. Apparatus as set forth in claim 10, wherein each of said platforms is provided with a pinion gear disposed beneath a threaded article disposed thereon to provide said contacting portion of said platform, and said stationary means for contacting said platform portion comprises a rack gear disposed along said support path, having a plurality of teeth aligned for mating engagement with said pinion gear.

12. Apparatus as set forth in claim 10, wherein said support member is a circular table mounted for rotation and having said platforms disposed about the periphery thereof for movement along a circular path.

13. Apparatus as set forth in claim 10, which further includes means disposed adjacent said stationary contacting means, for retaining said threaded articles on said platforms during rotation thereof.

14. Apparatus as set forth in claim 13, wherein said means for retaining said threaded articles on said platforms comprises a belt aligned for contact with said threaded articles during rotation thereof.

15. Apparatus as set forth in claim 10, wherein said support member is a circular table mounted for rotation and having said platforms disposed about the periphery thereof for movement about a circular path.

16. Apparatus as set forth in claim 15, which further includes means disposed adjacent said rack gear for retaining said threaded articles on said platforms during rotation thereof.

17. Apparatus as set forth in claim 16, wherein said means for retaining said threaded articles on said platforms comprises a belt aligned for contact with a portion of said threaded articles during rotation thereof.

18. Apparatus for applying locking patches of resilient resin to a succession of internally threaded articles having openings at both ends of the threaded portions comprising;

a feeder to supply said threaded articles in substantially continuous succession;

a support for receiving said threaded articles from said feeder and conveying them in a first substantially fixed relation with respect to said support for a portion of a path for treatment of successive threaded articles with the axes of their threaded portions in an up and down position and with the openings at the upper and lower ends of the threaded portions substantially uncovered;

means for heating said threaded portions of said threaded articles to a temperature above the softening point of resin to be applied;

means associated with such of said threaded articles and in substantially fixed relation to a selected resin deposition area of threaded surface of its associated threaded article in said selected portion of said path for directing particles of heat fusible resin upwardly through said openings at the lower ends of each of said threaded articles against said area of each of said threaded portions of said threaded articles in said portion of said path to cause said resin particles to be softened by heat from said threaded portions and to build up a deposit on each said area, said support having a plurality of rotatable platforms disposed thereon, one for receiving each of said threaded articles; and stationary means located adjacent the path of said support for contacting a portion of each said platform to thereby cause rotation of said platform and a threaded article disposed thereon through a desired angle, during movement of said support along said path.

19. Apparatus as set forth in claim 18, wherein each of said platforms is provided with a pinion gear disposed beneath a threaded article disposed thereon to provide said contacting portion of said platform and said stationary means for contacting said platform portion comprises a rack gear having a plurality of teeth aligned for mating engagement with said pinion gear.

20. Apparatus as set forth in claim 19, wherein said support member is a circular table mounted for rotation having said platforms disposed about the periphery thereof for movement along a circular path.

21. Apparatus as set forth in claim 20, which further includes means disposed adjacent said stationary contacting means, for retaining said threaded articles on said platforms during rotation thereof.

22. Apparatus as set forth in claim 21, wherein said means for retaining said threaded articles on said platforms comprises a belt aligned for contact with a portion of said threaded articles during rotation thereof.

23. Apparatus for applying locking patches of resilient thermoplastic resin to internally threaded articles having openings at both ends of the threaded portion comprising:
    rotatable support means having a surface for receiving a plurality of internally threaded articles and rotating them in a plane of rotation;
    a plurality of conduits disposed beneath said support means each having a first opening formed therein and directed toward that portion of the internal threads of threaded article supported on said support means, to which the patch is to be applied;
    said conduit means having a second opening at the opposite end thereof for receiving a thermoplastic resin to be deposited on the threads of an article;
    discharge means for providing thermoplastic material under pressure at said second opening, said plurality of conduits being rotatable in a plane forming an angle with the plane of rotation of said support means;
    means interconnecting said plurality of conduits with said support means for rotation therewith;
    means for rotating said support means and said conduits, wherein said threaded article is received on said support means, after which said conduit second opening is moved into registration with said discharge means.

24. Apparatus as set forth in claim 23, wherein rotation of said support means and said conduit means is effective to cause each said conduit opening to be moved upwardly with respect to said support means surface, and to be moved downwardly to a position adjacent said surface.

25. Apparatus as set forth in claim 24, wherein said support means has a plurality of rotatable platforms disposed thereon, one for receiving each of said threaded articles, and stationary means located adjacent the path of rotation of said support means for contacting a portion of each said platform to thereby cause rotation of said platform and a fastener disposed thereon through a desired angle during rotation of said platform.

26. A process for applying resilient locking resin to a succession of internally threaded articles having an open end to the threaded portion thereof, comprising:
    conveying said threaded articles on a support in a path for treatment with the axes of their threaded portions in an up and down position and with their openings at the threaded portions substantially uncovered;
    heating said threaded portions of said threaded articles to a temperature above the softening point of the resin to be applied;
    directing particles of heat fusible resin upwardly from an applicator means rotatively mounted in a lower support, through said openings at the lower ends of said threaded articles against an area of each of said threaded portions during movement along a portion of said path to cause said resin particles to be softened by heat from said threaded portions and to build up a deposit on said area;
    turning said threaded articles and said applicator means about their axes with respect to one another while directing said resin particles through said openings during a predetermined arcuate angle at a substantially uniform rate of rotation.

27. A process for applying resilient locking resin to a succession of internally threaded articles, as recited in claim 26, wherein said threaded article is turned with respect to said support and with respect to said applicator means.

28. A process for applying resilient locking resin to a succession of internally threaded articles, as recited in claim 26, wherein said applicator means is turned with respect to said support and said threaded article.

29. A process for applying resilient locking resin to a succession of internally threaded articles, as recited in claim 26, wherein said support conveys said threaded articles through a circular path.

30. A process for applying resilient locking resin to a succession of internally threaded articles, as recited i claim 26, wherein said resilient locking resin is deposited in the threaded portions of said threaded articles through an angle of 360 degrees.

31. A process for applying resilient locking resin to a succession of internally threaded articles, as recited in claim 30, including:
    rotating said threaded articles on said support through a horizontal plane, and
    rotating said applicator means on a plane which is skewed with respect to the plane of rotation of said support.

32. A process for applying resilient locking resin to a succession of internally threaded articles as recited i claim 30, including:
    rotating said applicator means in a horizontal plane, and
    rotating said threaded articles on said support in a plane which is skewed with respect to the plane of rotation of said applicator means.

33. A process for applying resilient locking resin to a succession of internally threaded articles as recited in claim 31, including:

arranging a pinion gear about said applicator means in said lower support;

arranging a stationary rack gear about the plane of rotation of said pinion gear on said lower support, and engaging the teeth of said pinion gear about said applicator means and said rack gear so as to effectuate the turning of said applicator means with respect to said threaded article, when said support is rotated.

34. A process for applying resilient locking resin to a succession of internally threaded articles as recited in claim 32, including:

arranging a pinion gear as a platform for said threaded articles on said support;

arranging a stationary rack about the plane of rotation of said pinion gear comprising said platform on said support; and engaging the teeth of said pinion gear of said platform and said rack gear so as to effectuate the turning of said threaded article with respect to said applicator means when said support is rotated.

* * * * *